United States Patent [19]

Knabel et al.

[11] Patent Number: 4,611,497
[45] Date of Patent: Sep. 16, 1986

[54] FORCE TRANSDUCER

[75] Inventors: Walter Knabel, Murnau; Gerd Klubitschko, Oberau, both of Fed. Rep. of Germany

[73] Assignee: Marker International, Salt Lake City, Utah

[21] Appl. No.: 667,878

[22] PCT Filed: Mar. 3, 1983

[86] PCT No.: PCT/EP83/00059
§ 371 Date: Nov. 2, 1984
§ 102(e) Date: Nov. 2, 1984

[87] PCT Pub. No.: WO84/03561
PCT Pub. Date: Sep. 13, 1984

[51] Int. Cl.⁴ .................. G01L 1/18; H01L 10/10
[52] U.S. Cl. ................... 73/862.68; 338/47; 338/100

[58] Field of Search ............ 73/862.64, 862.68, 781; 338/47, 100, 109, 114

[56] References Cited

U.S. PATENT DOCUMENTS

| 2,090,188 | 8/1937 | Dahlstrom | 73/862.68 |
| 2,898,761 | 8/1959 | Hast | 73/DIG. 2 |
| 4,055,078 | 10/1977 | D'Antonio et al. | 73/767 |
| 4,163,204 | 7/1979 | Sado et al. | 338/100 X |

Primary Examiner—Charles A. Ruehl
Attorney, Agent, or Firm—D. Peter Hochberg

[57] ABSTRACT

A transducer for responding electrically to forces and torques applied to the transducer including a force-variable impedance element engaged by force members which are retained in bearing relationship with the impedance element by an annular retainer and which transmit applied forces to the impedance element.

18 Claims, 4 Drawing Figures

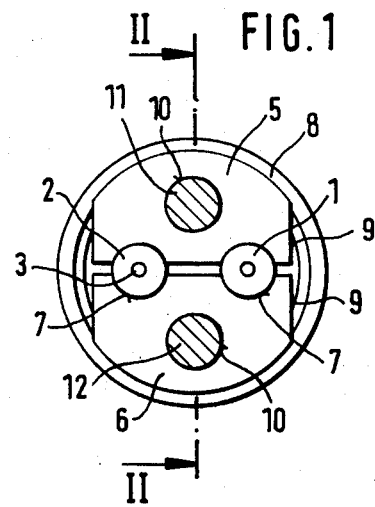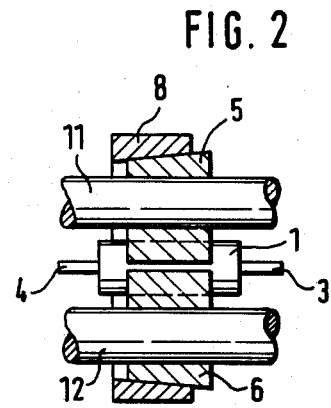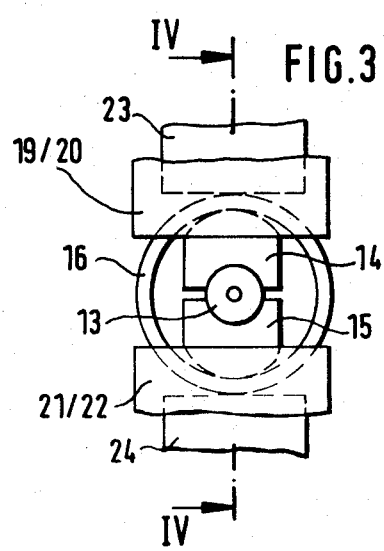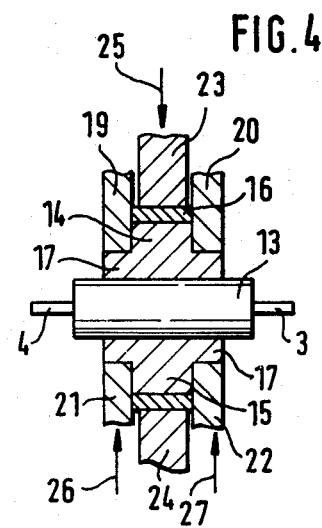

FORCE TRANSDUCER

BACKGROUND OF THE INVENTION

This invention relates to transducers for responding electrically to forces and torques applied to the transducers. Detection of changes in electrical values corresponding to applied forces and torques and electrical circuitry for processing the detected change of values are disclosed in U.S. Pat. Nos. 4,055,078 and 4,240,288 both issued D'Antonio et al. Those disclosures are incorporated by reference.

It is well known that conventional carbon composition resistors change resistance value in response to the application of pressure to them. By detecting the resistance change, the amount and direction of an applied force can be determined. Transducers incorporating resistors are known in the art. Those transducers are adaptable to many applications. It is desirable in some applications to apply a prestress or biasing force to the resistors to avoid a non-linear response characteristic when weak forces are applied and to enable detection of both compressive and tensile forces. See the patents to D'Antonio.

In many applications it is necessary that the transducer be small, lightweight, inexpensive and simple to manufacture and use, yet reliable and precise in operation.

SUMMARY OF THE INVENTION

The invention achieves a lightweight, small transducer that is simple in construction and reliable in performance. The transducer includes at least one force variable impedance element, which is preferably a conventional carbon composition resistor having a cylindrical body. Force transmitting members, preferably two symmetrical members, bear on the impedance element. The members are preferably opposed and spaced and include surfaces complementary in shape to that of the impedance element. The members can approach each other when compressive forces are applied and retract when those forces are relieved. An annular retainer retains the members in place to engage and bear on the impedance element. The members preferably have an arcuate surface, opposite the impedance element engaging surface, which bears on the inside surface of the retainer. Preferably, the members include surfaces adjacent the arcuate surface which are spaced from the retainer to avoid binding when the members move in response to applied forces, which may result from applied torques.

In one embodiment, the arcuate surfaces of the members are tapered and the inside surface of the retainer is tapered in a complementary fashion. When the members are pressed to seat more deeply in the retainer, the force produced is applied to the impedance element. By adjusting the relative seated position of the members with respect to the retainer, a biasing force may be applied to the impedance element to prestress it. By using a biasing prestress, both compressive and tensile forces can be detected by the transducer. The embodiment includes apertures in the force members by which the transducer may be mounted on rods. The movement of the rods applies the force to be detected.

In another embodiment particularly useful for sensing torques, a retainer holds opposing force members against an impedance element. Blocks engage the retainer at each of a pair of force members, and posts engage the respective opposing force members. When torque is applied in either of two opposite directions, opposing compressive forces are transmitted to the impedance element by the force members.

BRIEF DESCRIPTION OF THE DRAWINGS

FIG. 1 is a cross sectional front view of an embodiment of a transducer according to the invention.

FIG. 2 is a cross sectional view of the transducer embodiment of FIG. 1 taken along line II—II of FIG. 1.

FIG. 3 is a cross sectional front view of another embodiment of a transducer according to the invention.

FIG. 4 is a cross sectional side view of the transducer embodiment of FIG. 3 taken along the line IV—IV of FIG. 3.

DETAILED DESCRIPTION OF PREFERRED EMBODIMENTS

In FIGS. 1 and 2 an embodiment of a transducer according to the invention is shown in sectional front and side views. Like elements are given the same reference numerals and both figures are referred to generally in the following description. This embodiment can be used for generating electrical signals reflective of compressive and tensile forces applied in an electronic ski binding.

Two force-variable impedance elements 1 and 2 are shown as cylindrical in shape and have laterally projecting electrical leads 3 and 4. Leads 3 and 4 permit connection of elements 1 and 2 into electrical circuitry for detection of impedance changes in response to the force applied to the elements. Elements 1 and 2 are preferably conventional carbon composition resistors which are known to change resistance in response to applied forces. However, other and differently shaped force-variable impedance elements may also be employed.

Opposing force members 5 and 6 bear on opposite sides of elements 1 and 2. Each member has a grasping surface, numbered 7 for force member 6, having a shape complementary to that of the force variable impedance elements for engaging and bearing on those elements. Forces applied to one force member relative to the other are directly transmitted to elements 1 and 2 by their intimate contact with members 5 and 6.

Members 5 and 6 are retained in place, bearing on elements 1 and 2, by an annular retainer 8 which encircles members 5 and 6. Each member includes an arcuate surface, opposite the surface which bears on elements 1 and 2, which is complementary to the inside surface of retainer 8. Retainer 8 and member 5 and 6 engage each other along their complementary bearing surfaces. A spacing surface 9 on each member 5 and 6 adjacent the complementary bearing surfaces is spaced from retainer 8. In the embodiment shown, these spacing surfaces lie generally perpendicular to the surfaces which engage elements 1 and 2. The spacing surfaces permit members 5 and 6 to converge and retract in response to forces applied to them without the binding that would be present if each member 5 and 6 engaged retainer 8 over half its inside bearing surface.

Each member 5 and 6 includes a centrally disposed aperture 10 for receiving a mounting post for the transducer embodiment. A post 11 protrudes through aperture 10 in member 5 and another post 12 protrudes through the corresponding aperture in member 6. Forces applied to posts 11 and 12 are, in turn, applied to the transducer because of the engagement of posts 11 and 12 with force members 5 and 6, respectively.

An important feature of the embodiment is shown in FIG. 2. As shown there, the inside bearing surface of retainer 8 is tapered and the arcuate surfaces of force member 5 and 6 are tapered in a complementary manner. The inside bearing surface of retainer 8 has a shape of the surface of a frustrum of a cone. The tip of the cone, if it existed, would lie to the left side of FIG. 2. Pushing members 5 and 6 into retainer 8, i.e., to the left, in FIG. 2, produces forces which urge members 5 and 6 together. As a result, forces are applied to impedance elements 1 and 2. The application of force by the transducer embodiment itself permits elements 1 and 2 to receive a biasing or prestressing force. Prestressing elements 1 and 2 achieves two important ends. First, when the elements are carbon composition resistors, they provide a non-linear response to weak forces. By prestressing the elements, operation in the non-linear region is avoided. Second, carbon composition resistors are sensitive only to pressure, i.e., compressive forces, not tensile forces. By prestressing elements 1 and 2, both increased compression and tensile forces, i.e., a relief of compression, can be detected. The amount of the prestressing force may be adjusted by adjusting the positions of members 5 and 6 with respect to retainer 8. The complementary bearing surfaces on retainer 8 and member 5 and 6 may be threaded to aid the adjustment of their relative positions and the amount of prestressing force.

A related embodiment of the invention is shown in FIGS. 3 and 4. The latter embodiment is particularly adapted for measuring torques, and can be used for generating electrical signals reflective of the torque applied by a ski boot twisting in an electronic ski binding. A single force variable impedance element 13 is shown, again having electrical leads 3 and 4. Opposing force members 14 and 15 bear on element 13 and include grasping surfaces complementary in shape to that of element 13. An annular retainer 16 encircles members 14 and 15, bearing on them and retaining them in place. Although the radii of the annular retainer and of the arcuate surfaces of the force members in the embodiment previously described were the same, those radii are different in the embodiment shown in FIGS. 3 and 4. The radii of the arcurate surfaces on members 14 and 15 which bear on the inside surface of retainer 16 are smaller than the radius of that surface of retainer 16. As a consequence, the mutual bearing surface area of members 14 and 15 and retainer 16 is reduced.

As best seen in FIG. 4, each force member includes a shoulder 17 extending laterally from each side of retainer 16. The lateral direction is taken along the length of the element 13, perpendicular to the mutual bearing surfaces of members 14 and 15 and retainer 16. The shoulders allow the embodiment to be mounted between pairs of posts which are fixed relative to each other, such as on a plate attached to a ski. One of the pairs, posts 19 and 20, lie at the top of FIGS. 3 and 4 and on opposite sides of member 14. The other pair, posts 21 and 22, lie at the bottom of FIGS. 3 and 4 and on opposite sides of member 15. By properly choosing the separation of the post pairs in relation to the other dimensions of the embodiment, element 13 can be prestressed when members 14 and 15 are installed in the mounting.

A pair of opposing blocks 23 and 24 lying between posts 19 and 20, and 21 and 22, respectively, are shown in FIGS. 3 and 4. Blocks 23 and 24 are mounted on a common member, such as on a ski to which the plate referred to above is attached. Block 23 is resiliently connected to posts 19 and 20 and block 24 is similarly connected to posts 21 and 22. Blocks 23 and 24 may bear upon opposite outside surfaces of retainer 16 for applying forces to the transducer. As illustrated in FIG. 4, when a torque is applied to the transducer such as when a ski boot twists in one direction in an electronic ski binding incorporating the transducer, forces 26 and 27 are applied to posts 21 and 22, and an equal and opposite force 25 is applied to block 23. This force is reflected by a corresponding change of impedance of element 13. An opposite torque creates a corresponding effect on posts 19 and 20, and on block 24. In this embodiment, only compressive forces are applied in either of two opposing directions, so prestressing is not required. If element 13 were to be prestressed, tensile forces might also be detected.

The described embodiments of the inventive transducer have only a few, simple parts. Therefore the transducer is simple and economical to manufacture. Moreover, the transducer may be very small since the only possibly limiting dimensions are those of the force variable impedance element.

The invention has been described with respect to certain preferred embodiments. Various additions, modifications and substitutions without departing from the spirit of the invention will occur to one of skill in the art. Therefore, the scope of the invention is limited solely by the following claims.

We claim:

1. A transducer for electrically responding to external forces and/or torques applied to said transducer, said transducer comprising:
   force-variable impedance means for changing impedance in response to applied external forces;
   force transmitting means bearing about the periphery of said impedance means for transmitting forces applied to said transducer to said impedance means, said force transmitting means bearing on said impedance means and having a cross-section with at least a partially curved periphery; and
   retaining means disposed about the periphery of said force transmitting means, said retaining means having a curved inner surface bearing on the curved periphery of said force transmitting means for retaining said force transmitting means in bearing relationship with said impedance means.

2. The invention according to claim 1 wherein said force transmitting means comprises at least two force members bearing on said impedance means and on said retaining means.

3. The invention according to claim 2 wherein the peripheries of said force members are at least partially cylindrical, and said retaining means comprise an annular retainer encircling said force members in engagement with said cylindrical peripheries.

4. The invention according to claim 3 wherein said force members include grasping surfaces for generally surrounding and bearing on the periphery(ies) of said impedance means.

5. The invention according to claim 4 wherein each of said force members includes at least one spacing surface transverse to the periphery of said force member defining a space between the periphery of said force member and said retaining means.

6. The invention according to claim 3 wherein the surface of said annular retaining means in engagement with the cylindrical peripheries of said force members and the cylindrical peripheries of said force members have substantially common radii of curvature.

7. The invention according to claim 6 wherein said impedance means comprises a carbon composition resistor.

8. The invention according to claim 3 wherein the surface of said annular retaining means in engagement with the respective cylindrical peripheries of said force members has a radius of curvature overlapping and greater than the radius of curvature of said respective cylindrical peripheries.

9. The invention according to claim 2 wherein said retaining means and said force members include complementary, mutual bearing surfaces.

10. The invention according to claim 2 wherein at least one of said force members includes grasping means having a surface complementary in shape to that of said impedance means for engaging and bearing on said impedance means.

11. The invention according to claim 2 wherein at least two of said force members include aperture means and mounting means extending into said aperture means, said mounting means applying the external forces to said force members.

12. The invention according to claim 1 and further comprising prestressing means for prestressing said impedance means, said prestressing means compressing complementary, tapered bearing surfaces on said retaining means and on said force transmitting means.

13. The invention according to claim 12 wherein said force transmitting means comprises at least two force members bearing on said impedance means and said retaining means.

14. The invention according to claim 1 wherein said force transmitting means comprises opposing force members bearing on opposite sides of said impedance means, block means fixable to a base for applying compressive force to one of said force members, and opposing post means, said block means and said post means applying compressive force to said force member in response to the application of torque to said post means.

15. The invention according to claim 14 wherein said force members comprise a pair of opposing force members on opposite sides of said impedance means, said force members each having shoulder means spaced apart from each other, and wherein said post means comprise posts engaged with the respective shoulder means.

16. The invention according to claim 15 wherein said retaining means comprises a retainer engaging both of said force members between the respective pairs of shoulder means, and wherein said block means apply forces to said retaining means in response to said torque.

17. The invention according to claim 15 wherein the block means and the post means applying force to a particular force member are resiliently attached together.

18. The invention according to claim 1 wherein said impedance means comprises a resistor and wherein said impedance includes the resistance of said resistor.

* * * * *